July 16, 1935.  F. R. MOTT  2,008,400
THERMOSTATIC VALVE
Filed Jan. 4, 1934
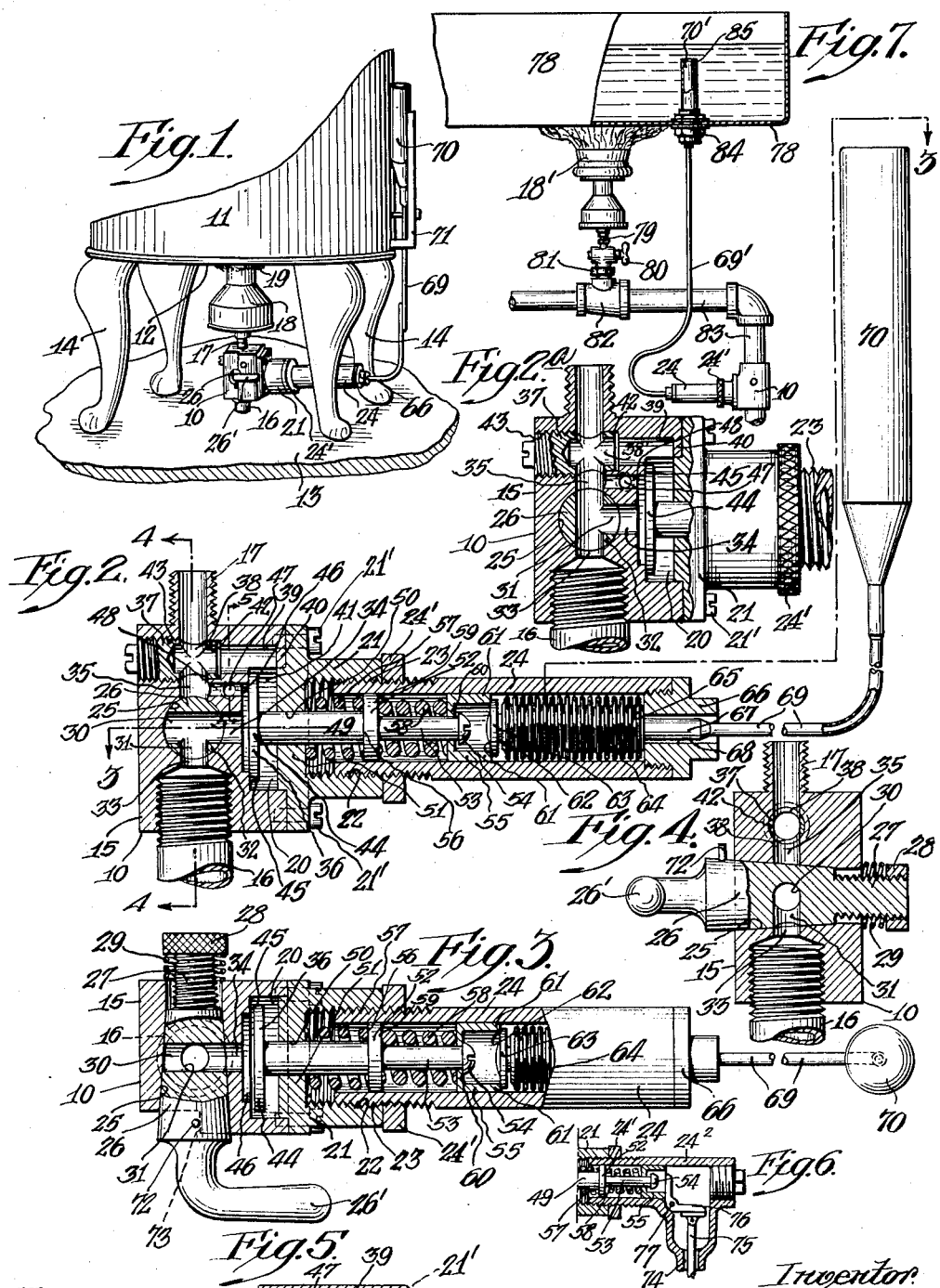

Patented July 16, 1935

2,008,400

UNITED STATES PATENT OFFICE 2,008,400

THERMOSTATIC VALVE

Frederick R. Mott, Elkins Park, Pa., assignor to Yarnall-Waring Company, Philadelphia, Pa., a corporation of Pennsylvania Application January 4, 1934, Serial No. 705,184

16 Claims. (Cl. 236—32)

My invention relates to temperature control valves for fuel heated vessels, such as coffee or hot water urns, deep fat frying pans, steam tables, constant temperature baths, etc.

A purpose of my invention is to locate a temperature responsive fluid in heat transfer relation to the vessel whose temperature is to be controlled, to operate a bellows, by expansion of the fluid, so as to close a valve, and to permit over-travel of the bellows after the valve is closed, without injuring the bellows or the valve.

A further purpose is to interpose a precompressed spring in train between a bellows and a valve controlled by the bellows, to allow for over-travel of the bellows.

A further purpose is to mount a temperature operated bellows upon a sleeve adjustably connected to the casing of a valve moved by the bellows, so that adjustment of the valve may be accomplished through adjustment of the sleeve.

A further purpose is to place a fluid operated bellows axially in line with a valve and valve stem, to urge the valve toward open position by a relatively weak spring surrounding the stem and to transmit motion from the bellows to the valve through a spring stiffer than the relatively weak spring.

A further purpose is to locate a main burner volume control in alternative main burner supply passages, and to simultaneously adjust the flow from both passages by different concurrently adjustable ports on the volume control.

A further purpose is to provide a manual change-over valve to shift from thermostatic to non-thermostatic operation of a burner, and to close off flow of fuel to the burner.

Further purposes appear in the specification and in the claims.

In the drawing I have illustrated only one of the many forms of my invention, with a plurality of modes of application, choosing the form shown from the standpoints of satisfactory operation, simplicity of construction and convenient illustration of the principles involved.

Figure 1 is a fragmentary perspective view showing my improved temperature regulating gas valve mechanism applied to a coffee or hot water urn.

Figure 2 is a longitudinal vertical sectional view of my valve mechanism on enlarged scale.

Fig. 2a is a fragmentary view similar to a portion of Figure 2, but showing the valve plug in a different position.

Figure 3 is a top plan view, partly in section on the line 3—3 of Figure 2.

Figure 4 is a transverse sectional view taken on the line 4—4 of Figure 2.

Figure 5 is a fragmentary transverse sectional view taken on the line 5—5 of Figure 2.

Figure 6 is a fragmentary sectional view of a modification and corresponding in position to Figure 3.

Figure 7 is a side elevation of a modified device in which my valve is used, and in which the valve is applied to a steam table or deep fat frying pan to control the temperature in the fluid medium, (steam, melted fat, etc.).

My improved valve mechanism is intended for use upon vessels or urns of the type that are employed for heating coffee, water and chocolate and which are almost universally used in restaurants and like places where it is desired to keep liquids at a uniform predetermined temperature. It also has been successful when applied to fudge warmers, deep fat fryers and steam tables in which it is desired to maintain a uniform predetermined temperature of the fluid medium being heated. Many other uses of my invention will readily occur to persons skilled in the art, as for the control of constant temperature baths, retorts, reaction vessels, etc., but I do not wish, by enumeration, to limit myself under the rule of ejusdem generis.

In Figure 1 I have illustrated my improved thermostatic valve 10 as applied to a vessel or urn 11 of the type used in restaurants for heating coffee, water or chocolate. In this illustration the valve 10 is placed in a space below the bottom 12 of the urn, above the urn support 13, and between the legs 14 by which the weight of the urn is carried.

My valve 10, as shown in the structure of Figures 1 to 5, includes a valve body 15 equipped with a gas supply pipe 16 which extends downwardly from the valve and through the urn support 13. An externally threaded outlet 17 from the valve 10 is connected to a gas burner 18. The burner is positioned close to the urn in order that the flame 19 will heat the bottom 12 of the urn 11. The valve controls the flame, and thereby controls the temperature of the liquid in the urn.

An open end 20 of the valve body 15 is covered by a cap extension 21, fastened to the valve body by screws 21'. The cap is internally threaded at 22 to receive a threaded end 23 of a sleeve 24 that extends laterally from the valve 10. A lock nut 24' is threaded on the sleeve 24 to make engagement with the cap 21 and locks the sleeve in any desired position with respect to the cap.

The valve body 15 is provided with a tapered bore 25 into which bore a tapered valve plug 26, having a handle 26', is inserted. The inner end of the plug is reduced in diameter and threaded at 27 to receive a cap 28. The cap 28 extends beyond the valve body, allowing a space between the valve body and the cap, into which space, about the threaded end 27 of the plug, I place a coiled spring 29 which causes the tapered valve plug to remain properly seated in the tapered opening in the valve body by reason of the spring pressure between the plug cap 28 and the valve body 15.

The valve plug 26 is transversely bored at 30 and laterally bored at 31 on one of its sides 32 to provide a branching passage for purposes hereinafter described.

Adjacent the valve plug 26 and in the valve body 15, are located ports 33, 34 and 35. The port 33 is a reduction of the opening into which the supply pipe 16 is inserted. The port 34 is controlled by a thermostatically operated valve 36 and the port 35 communicates with the outlet 17 which supplies the burner 18 with gas. Between the port 35 and the outlet 17 is positioned a volume control valve plug 37, laterally ported at 38 and when in open position allowing passage of gas between the port 35 and the outlet 17. The volume control valve plug 37 also has an end port 38'.

In placing the volume control valve in the main valve body 15, I have found it desirable to bore the valve body at 39 from the side in which the plug is inserted, almost all the way across the valve body, leaving an end wall 40 in the valve body, but forming a communication with a chamber 41 provided in the cap end of the valve body 15.

The bore 39 is counterbored at 42 and threaded at 43 to receive the volume control valve plug 37.

A disc valve 44 in the chamber 41 is adapted to seat against a shoulder 45 to open or close the passage 34 in the body 15. In the present showing I have preferred to interpose a recess 46 between the valve seat shoulder 45 and the passage 35.

An adjusting screw 47 for pilot control is positioned in a passage 48 between the recess 46 and the port 35 of the main valve body.

The valve 36 has a stem 49 which projects longitudinally through an opening 50 in the cap closure portion 51 of the cap 21, into one end of the sleeve 24. The stem includes a collar 52, a reduced stem 53 and a screw 54. The head of the screw 54 acts as a stop to limit the movement of a slip ring 55 which surrounds the reduced stem 53 and makes a sliding closure connection with the interior of the sleeve walls.

About the stem 49 and between the cap closure portion 51 and one side 56 of the collar 52, I locate an inner coiled spring 57. I also place a heavier coiled spring 58 about the reduced stem 53 between the side 59 of the collar 52 and a wall 60 of the slip ring 55. The spring 58 tends to urge the valve 36 into engagement with the valve seat 45.

The slip ring 55 in the present showing is cup shape with its extending tubular portion 61 in position within the sleeve 24 to engage the front surface 62 of a disc 63 rigidly secured to one end of a fluid-operated extensible bellows 64. The other end of the bellows 64 engages and seats against the surface 65 of a bellows locking plug 66. The bellows 64 has a hollow projection 67 which extends longitudinally into an opening 68 in the bellows locking plug 66 and the projection 67 is joined with a reduced tube 69 which extends to a liquid filled bulb 70 located at any desired position adjacent or within an object whose temperature is to be controlled, which object is located remotely from the valve and is here illustrated as attached by a bracket 71 to the urn 11 and in heat transfer relation with the urn.

A pin 72 is inserted through the plug 26 and projects through the plug. This pin 72 acts as a stop for the plug to limit the plug movement by engagement of the end of the pin 72 against a shoulder 73 integral with the valve body 15.

The connection between the bellows 64 and the valve 36 may be varied to suit the conditions and the wishes of the individual designer. In Figure 6 I show a variant form having a fitting 24² provided with a side opening 74 through which a rod 75, connected to the bellows 64 (not shown in Figure 6) actuates a bell crank lever 76 pivoted at 77, on the wall of the fitting 24. One end of the bell crank lever presses against the slip ring 55 when the rod 75 is moved under the action of the bellows 64. In this form, the valve and the valve springs are directly in line, although the bellows is not in line with the valve.

Many other variations in the design of the valve may be made without departing from my invention.

In Figure 7 I have shown my improved valve 10 as applied to a fuel line which is connected to heat a steam table or deep fat frying pan, for automatic control of the temperature of the steam table or frying pan.

In Figure 7 a steam table 78 is placed above a burner 18'. Below the burner 18' and located in the gas feed line 79 to the burner is a hand control valve 80. This valve 80 is supplied with gas through a fitting 81, connected to a T fitting 82 in a pipe line 83, which pipe line connects to the valve 10.

From the end of the valve 10 extends a tube 69' which continues through a fitting 84 to a bulb 70' enclosed in a casing 85 in the bottom of the steam table 78.

In all of the forms of my invention, the bulb 70 containing the temperature responsive liquid, which may be acetone, for example, for a given temperature range, and may be any other suitable material for a different temperature range, will be in heat transfer relation with the vessel whose temperature is being controlled, regardless of whether that vessel be a coffee, water, or chocolate urn, a steam table, a deep fat frying pan, a constant temperature bath or a retort or reaction vessel, etc.

When the fuel supply to the vessel whose temperature is being controlled is to be cut off entirely, this can be accomplished readily by manually shifting the plug valve 26 to a position in which the fuel supply port 33 is entirely closed. This position will be that in which the valve is located 180° from the position shown in Figure 2.

When it is desired to start operation of the vessel whose temperature is to be controlled, the plug valve 26 should preferably be turned to the position shown in Figure 2. As the vessel whose temperature is being controlled is initially at a temperature below the desired temperature, the thermostatic valve 36 is open at this time and gas or other suitable fuel is free to enter the port 34, the circular recess 46, the bore 47, and then to flow through the volume control valve 37 to the burner 18.

At this time the main burner can be lighted, and will heat up the vessel whose temperature is being controlled to a point at which thermostatic operation of the valve 36 will reduce the flow of gas to the burner. While the burner is operating, a small and at that time insignificant flow of gas also takes place from the circular recess 46 through the pilot supply port 48 into the port 35. When the vessel whose temperature is being controlled is sufficiently heated to cause the valve 36 to close by expansion of the fluid in the bulb 70, and corresponding extension of the bellows 64, the gas flowing through the pilot supply port 48 will be the only gas reaching the burner. It will then be possible to adjust the pilot flame to make it larger or smaller by moving the screw 47 in or out. In any case, the pilot flame should be inadequate to maintain the vessel whose temperature is being controlled at the desired temperature, so that the pilot flame will require periodic supplementation by the opening of the valve 36 when the temperature of the vessel whose temperature is being controlled falls below the desired point.

Assuming still that the valve 36 is closed, heat losses during continued operation will permit the vessel whose temperature is being controlled to drop in temperature to a point such that the liquid in the bulb 70 will cool and permit retraction of the bellows 64 with or without assistance of the spring 57, with corresponding opening of the valve 36. As the valve 36 opens, gas or other fuel from the port 34 and recess 46 is permitted to enter the bore 39 and the central port 38' of the volume control valve 37, from which point it flows to the burner. Thus the burner flame increases somewhat from the previous pilot (or other minimum) flame to the main burner flame 19, heating the vessel whose temperature is being controlled at a relatively rapid rate.

When the thermostatic valve 36 is operating normally, the difference between the position of the valve corresponding to the maximum burner flame and that corresponding to the minimum burner flame may be very slight, and the valve may not fully close or fully open. When the main burner flame 19 is burning, it may be adjusted by turning the volume control valve 37 and rotating the lateral ports 38 with respect to the bore of the outlet 17. Normally the volume control valve 37 will be adjusted relatively infrequently after the valve is first put in operation. Adjustment will usually be required only when a radical change in pressure or content of the fuel takes place.

It will be noted that the volume control 37 simultaneously adjusts flow of gas to the main burner through the open valve 36 and flow of gas to the main burner through the port 35 when the plug valve 26 is manually shifted to the position of Figure 2a. By introducing gas to the volume control valve 37 from the open thermostatic valve 36 through the centrally located port 38', change in the opening of the port 38' with rotation of the volume control valve 37 is avoided.

After the full flame 19 has been effective for a time sufficient to heat the vessel whose temperature is being controlled to the desired temperature, expansion of the thermostatic liquid in the bulb 70 will cause extension of the bellows 64 and closure of the thermostatic valve 36, thus leaving merely the pilot flame in operation. The pilot flame cannot be cut off with the plug valve 26 in the position of Figure 2, as it is important that the flame should not go out completely.

As the vessel whose temperature is being controlled comes up to temperature, under the action of the main flame 19, the extension of the bellows 64 due to expansion of the thermostatic liquid in the tube 70 is frequently more than sufficient to close the valve 36. In this case, after the valve 36 is seated as shown in Figure 2, further extension of the bellows 64 will cause the spring 58 to be additionally compressed. The spring 58 is at all times compressed to a certain extent so that it can transmit normal motion of the bellows to close the valve 36, and it is only after the valve 36 is closed that further pressure on the slip ring 55 compresses the precompressed spring 58. The spring 58 is considerably stiffer than the valve return spring 57, whose function is merely to open the valve when the bellows retracts, and keep the slip ring 55 in constant contact with the end 63 of the bellows 64.

As the thermostatic valve 36 closes, the spring 57 is compressed, but the spring 58 is not compressed by virtue of closing of the valve 36 until the valve is fully closed, when the spring 58 is further compressed to allow for overtravel of the bellows.

As the valve 36 opens, the spring 58 expands as much as it has previously been compressed to take care of overtravel of the bellows. When the slip ring 55 is firmly seated against the head of the screw 54, the spring 58 cannot further expand. Further retraction of the bellows then permits expansion of the valve-return spring 57 and opening of the valve 36.

For a given range of temperature control, a suitable thermostatic liquid should be chosen to fill the bulb 70, the tube 69 and the bellows 64. For a given thermostatic liquid, the temperature at which the thermostatic valve 36 is effective to cut off the fuel is variable by screwing the sleeve 24 in or out of the cap extension 21. In other words, adjustment of the sleeve 24 changes the temperature setting of the valve 36, and changes the temperature maintained in the vessel whose temperature is being controlled. The sleeve may be fastened in any desired position by the lock nut 24', after suitable adjustment of the valve has been accomplished.

In case of failure of the thermostatic valve to function through breakage of any of the parts, the entire device may be manually operated by shifting the plug 26 to the position of Figure 2a, in which there is direct fuel flow from the fuel supply to the burner regardless of the thermostatic valve position.

In shifting the plug valve 26 from the thermostatic position of Figure 2 to the manually operated position of Figure 2a, it will be evident that the flow of gas to the burner 19 is at no time cut off because the ports 30 and 31 of the plug valve overlap in relation to the fuel supply port 33. In other words, the arcuate distance along the surface of the plug valve 26 between the adjacent edges of the valve ports 30 and 31 is less than the diameter of the fuel supply port 33. This arrangement of the plug valve 26 permits shifting from thermostatic to manually operating positions without relighting the burner 19.

In the normal construction of coffee urns, it is common to locate one water urn between two coffee urns. In order to transfer water from the water urn to one of the coffee urns, it is necessary to increase the temperature of the water urn so as to develop steam in the water urn to the extent of perhaps a fraction of a pound per square inch.

By my valve, I can conveniently overheat the water urn by simply shifting the change-over plug valve 26 to the position of Figure 2a, and leaving the plug valve 26 in that position until sufficient steam has been developed in the water urn to transfer the water to the coffee urn. The plug valve 26 can then be returned to the thermostatic position shown in Figure 2.

It will be evident that the thermostatic valve 36 closes progressively as the vessel whose temperature is being controlled comes close to the desired temperature. If the temperature being controlled is rather low, the thermostatic valve 36 will close progressively until it seats completely, leaving only the pilot flame in operation. If the temperature being controlled is somewhat higher, the thermostatic valve 36 will close progressively, but will not fully seat, because, before it has an opportunity to fully seat, the flame will be insufficient to maintain the temperature and the thermostat will operate to cause opening of the valve 36. In all cases of thermostatic operation except when the valve is fully seated, the burner is supplied with fuel through the valve 36 and also through the pilot supply port 48.

I find that I can obtain such accurate control by properly adjusting the sleeve 24 that the vessel whose temperature is being controlled will maintain the proper temperature within plus or minus two degrees Fahrenheit, which is satisfactory for ordinary commercial work. By changing the bellows filling material to use a liquid having a lower coefficient of expansion, a still more accurate temperature adjustment may be obtained. There are many available liquids which may be used to fill the bulb 70, the bellows 64 and the tube 69, and the selection of the proper liquid will depend upon the temperature. For their respective temperature ranges, I suggest acetone, peanut oil, etc.

The entire thermostatic mechanism may be removed by unscrewing the bellows lock plug 66, and the thermostatic valve 36 may be taken out by removing the screws 21'.

The form shown in Figures 2–5 inclusive is preferable, but many variations may be made, of which Figure 6 is merely an example. The form of Figure 6 would be suitable for a device in which it was desired to have the bellows farther removed from the valve 36, and therefore less subject to possible high temperature conditions adjacent the valve 36. In general, however, the volume of the thermostatic liquid in the bulb 70 is so much greater than the volume of thermostatic liquid in the tube 69' and the bellows 64 that the variation of temperature at the bellows can introduce but little error into the thermostatic control.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a device for thermostatic valve control, a fluid operated bellows adapted to give longitudinal movement with change in fluid temperature, a valve having an axis in line with the axis of the bellows, a valve stem thereon, a plurality of springs surrounding the valve stem, one spring stiffer than the other spring, a collar on the valve stem between the springs and means located between the bellows and the stiffer spring for closing the valve and permitting relative movement between the bellows and spring to compress the stiffer spring for bellows movement beyond that required for valve closing.

2. In a fluid pressure operated gas valve, a valve casing, walls forming a gas passage through the valve open at all times for pilot use, a valve closure for the main gas flow providing room for pilot gas flow across the face of the closure when the valve is closed, a valve stem for the closure having a collar intermediate the length of the stem, a coiled spring located about the valve stem between the collar and the valve casing, a heavier coiled spring about the stem on the opposite side of the collar from the first spring, a slip ring about the valve stem engaging the second spring and permitting movement about the valve stem in compression of the second spring after the first spring has been compressed to valve seating position of the closure and longitudinally extensible thermostatically controlled means engaging the slip ring to operate it for seating of the closure.

3. A casing providing a valve opening, a valve seat surrounding the opening, a valve closure engaging the seat, a tubular casing extension in line with the axis of the valve, a valve stem extending into the tubular extension, a collar on the valve stem, a spring between the collar and the casing on the side occupied by the valve, a stiffer spring about the valve stem on the opposite side of the collar from the first spring, a lost motion member engaging the stiffer spring and permitting compression of the stiffer spring for overtravel of the lost motion member, a plug closing the outer end of the tubular extension and having an opening, a bellows having abutment on the plug, engaging the lost motion member and thermostatically controlled fluid connections for the bellows passing through the plug.

4. In a temperature-control valve, a valve body having a fuel port from a fuel supply to a burner, the body having a lateral opening facing the valve, a sleeve connected to the body at the opening, a circular valve movable to close the port, having a stem extending into the sleeve and carrying a collar intermediate between the extremities of the stem, a relatively weak spring on the side of the collar nearest to the valve connection, a stop against which the relative weak spring acts to urge the valve toward open position, a slip ring on the end of the valve stem within the sleeve, the stem extending into the slip ring and carrying a head to prevent disengagement of the slip ring from the stem, a spring stiffer than the first mentioned spring placed between the collar and the slip ring, a bellows engaging the slip ring and free from direct contact with the stem and means for changing the extension of the bellows in response to change of temperature.

5. A temperature-control valve comprising walls forming a port for flow of fuel from a fuel supply to a burner, a valve movable longitudinally to close the port and having a valve stem, a spring around the valve stem continuously urging the valve toward open position, a bellows in prolongation of the valve stem, the bellows being under continuous pressure of said spring, a spring around the valve stem stiffer than the beforementioned spring interposed between the bellows and the valve and transmitting the pressure of the bellows to the valve and means holding an expansible fluid, connected to the bellows for movement of the bellows.

6. In a fuel-control valve, a valve body, walls forming a fuel port in the body from a fuel supply to a burner, a lateral extension from the valve body, a valve movable longitudinally of the lateral extension and closing the port, said valve having a stem, a spring around the valve stem continuously urging the valve toward open position, a bellows in the lateral extension in prolongation of the valve stem, the bellows being under continuous pressure from the spring, a yieldable connection, stiffer than the spring that urges the valve toward open position, between the bellows and the valve permitting overtravel of the bellows after the valve is closed, a bulb and fluid connections between the bulb and the bellows, there being an expansible fluid filling the bulb, the bellows and the fluid connections.

7. In a fuel-control valve, a valve body containing a fuel port between a fuel supply and a burner, a valve movable longitudinally to control the fuel port, and having a stem, a spring around the stem urging the valve continuously toward open position, a sleeve threaded into the valve body and adjustable with respect to it, a bellows within the sleeve and in prolongation of the stem, the bellows being under continuous pressure from said spring, compressible connections between the bellows and the valve including a spring around the stem, a temperature-responsive bulb and fluid connections between the bulb and the bellows, the bulb, bellows and fluid connections being filled with an expansible fluid.

8. In a temperature-control valve, a valve body having a fuel port from a fuel supply to a burner, a sleeve connected to the body, a circular valve movable to close the port and having a stem extending into the sleeve and carrying a collar intermediate between the extremities of the stem, a relatively weak spring on the side of the collar nearest to the valve, a stop against which the relatively weak spring acts to urge the valve toward open position, a slip ring on the end of the valve stem within the sleeve, a relatively strong spring between the collar and the slip ring, a bellows engaging the slip ring and free from direct contact with the stem and means for moving the bellows in response to change in temperature.

9. A valve having a body and a stem and adapted to be operated by longitudinal movement of the stem, having an abutment on the stem, said abutment having a side directed toward the valve and a side directed away from the valve, a first spring for opening the valve surrounding the stem between the body and the side of the abutment directed toward the valve, a second spring for closing the valve coaxial with the first and presenting an inner end to the side of the abutment directed away from the valve, and a thermostatic element having a portion coaxial with the stem adapted to respond to temperature changes by changes in longitudinal extension and having a longitudinal support at one end and an operating connection with the second spring at the other end.

10. The structure of claim 9 characterized by the stem having an outwardly extending outer portion beyond the side of the abutment directed away from the valve, a head on the outer end thereof and a slip ring between the second spring and the thermostatic element, the ring having a radially inward shoulder adapted to cooperate with the head to prevent relative disassembly of the ring, second spring and stem.

11. The structure of claim 9 characterized by the second spring having a stiffness high as compared to the stiffness of the first spring.

12. The structure of claim 9 characterized by a sleeve coaxially surrounding the stem, having an inner end threading into the body, an outer end rigidly supporting the outer end of the said extensible portion of the thermostatic element and intermediate its ends loosely surrounding the said members for operating the valve.

13. The structure of claim 9 characterized by a sleeve coaxially surrounding the stem, having an inner end threading into the body, an outer end rigidly supporting the outer end of the said extensible portion of the thermostatic element, intermediate its ends loosely surrounding the said members for operating the valve and the said sleeve having a longitudinal adjustment at its connection with the body.

14. In a thermostatic valve device, a valve body having a valve seat, a valve cooperating with the seat, a bellows operatively connected to the valve, a thermostat bulb in heat transfer relation with the object whose temperature is to be controlled, a tube communicating with the interior of the bulb and also communicating with the interior of the bellows, the bulb, tube and bellows being filled with an expansible fluid, and a sleeve surrounding the bellows and the portion of the tube adjoining the bellows, making a loose joint so that it is rotatable with respect to the bellows without rotating the bellows and adjustably threaded into the body, whereby the bellows and valve may be moved longitudinally forwardly and rearwardly with respect to the valve seat to determine the temperature of closing of the valve.

15. A thermostatic fuel-control valve device comprising a valve body having a valve seat, a longitudinally movable valve cooperating with the valve seat and having a valve stem, a sleeve surrounding the valve stem along a portion of its length and adjustably threaded into the valve body, a bellows within the sleeve, operatively connected to the valve stem and in straight line relation with respect to the valve stem, a plug having an opening, secured in the otherwise free end of the sleeve and engaging the end of the bellows opposite from that toward the valve stem, a tube extending through the opening in the plug and communicating with the interior of the bellows and a bulb connected to the end of the tube, having its interior in communication with the interior of the tube and in heat transfer relation with the object whose temperature is to be controlled, whereby the plug forms a fuel-tight engagement with the bellows and the sleeve and plug swivel with respect to the bellows during adjustment of the sleeve to change the temperature setting of the valve.

16. A thermostatic fuel-control valve device having a longitudinally movable valve cooperating with a valve seat, a bellows operatively connected to the valve and urging the valve towards closed position when the bellows extends, a thermostatic bulb, a tube connecting the thermostatic bulb and the bellows, the bulb, tube and bellows containing an expansible fluid and a bellows casing surrounding the bellows, supporting the end of the bellows away from the valve, swiveling with respect to the bellows and longitudinally adjustable for the purpose of setting the valve to vary the operating temperature of the valve.

FREDERICK R. MOTT.